(12) United States Patent
Miller

(10) Patent No.: US 7,007,578 B2
(45) Date of Patent: Mar. 7, 2006

(54) APPARATUS FOR REMOVING SAWDUST WHILE CUTTING WOOD

(76) Inventor: Freeman J. Miller, 8718 Bundysburg Rd., Middlefield, OH (US) 44062

( * ) Notice: Subject to any disclaimer, the term of this patent is extended or adjusted under 35 U.S.C. 154(b) by 85 days.

(21) Appl. No.: 10/705,007

(22) Filed: Nov. 10, 2003

(65) Prior Publication Data

US 2005/0098013 A1    May 12, 2005

(51) Int. Cl.
  *B23D 19/00*    (2006.01)
  *B23D 53/00*    (2006.01)
  *B26D 7/08*    (2006.01)

(52) U.S. Cl. .................. 83/102.1; 83/168; 83/788; 83/425.1

(58) Field of Classification Search .............. 83/168, 83/101, 102.1, 788, 808, 661, 425.1, 789, 83/792, 794
See application file for complete search history.

(56) References Cited

U.S. PATENT DOCUMENTS

| | | | |
|---|---|---|---|
| 286,706 A * | 10/1883 | Kay ........................ | 83/661 |
| 3,810,410 A | 5/1974 | Athanasoulas ............... | 83/852 |
| 4,333,370 A * | 6/1982 | Sack ........................ | 83/56 |
| 4,558,614 A * | 12/1985 | Harris ...................... | 83/56 |
| 5,001,957 A * | 3/1991 | Steckler ..................... | 83/792 |
| 5,642,766 A | 7/1997 | MacCauley, III ........... | 144/329 |
| 5,826,477 A | 10/1998 | Brewer, Sr. ................ | 83/168 |
| 6,532,850 B1 * | 3/2003 | Bergvall et al. ............. | 83/44 |
| 6,701,816 B1 * | 3/2004 | Smith ........................ | 83/74 |

FOREIGN PATENT DOCUMENTS

| | | | |
|---|---|---|---|
| DE | 9404583 | * | 5/1994 |
| JP | 62-208821 | * | 3/1986 |

\* cited by examiner

*Primary Examiner*—Boyer D. Ashley
(74) *Attorney, Agent, or Firm*—Tarolli, Sundheim, Covell & Tummino L.L.P.

(57) ABSTRACT

An apparatus for use in cutting wood and reducing dust accumulation on the wood includes first and second bands. The first band cuts the wood and creates saw dust during cutting of the wood. The second band removes saw dust from a kerf formed in the wood by the first band during cutting of the wood. The first band may be driven at a speed which is at least twice as great as the speed at which the second band is driven.

11 Claims, 2 Drawing Sheets

APPARATUS FOR REMOVING SAWDUST WHILE CUTTING WOOD

BACKGROUND OF THE INVENTION

The present invention relates to a new and improved apparatus for use in cutting wood and reducing saw dust accumulation on the wood.

In the cutting of wood, saw dust is generated. The saw dust tends to adhere to surfaces on the wood. Cleaning of the saw dust from the surfaces of the wood is time consuming and increases the cost of processing the wood. Therefore, in certain circumstances at least, the wood is processed without removing saw dust from the wood.

It has previously been suggested that a flow of air may be directed toward the wood to blow the saw dust off of the wood. Examples of devices utilizing air to blow saw dust off of the wood are disclosed in U.S. Pat. Nos. 5,642,766 and 5,826,477. It has also been suggested that teeth on a saw blade may be offset to be effective to remove dust from a saw kerf in the manner disclosed in U.S. Pat. No. 3,810,410. In addition, it has been suggested that a brushing device may be used to remove saw dust from planks (see U.S. Pat. No. 5,642,766).

SUMMARY OF THE INVENTION

The present invention relates to a new and improved apparatus for cutting wood and reducing saw dust accumulation on the wood. The apparatus includes a first band which cuts the wood. A second band removes saw dust from a kerf formed in the wood by the first band during cutting of the wood.

The first band, that is, the band which cuts the wood, may be moved at a first speed relative to the wood. The second band, that is, the band which removes saw dust from the kerf formed in the wood, may be driven at a second speed which is slower than the first speed. In one specific instance, the first band was moved at a speed which was at least twice as great as the speed at which the second band was moved.

The second band, that is, the band which removes saw dust from the kerf in the wood, may include projections which engage the wood during removal of saw dust. The projections on the second band may be formed at locations where openings extend through the second band. These openings may be formed by teeth along one edge portion of the second band and/or by openings disposed between opposite edge portions of the second band.

BRIEF DESCRIPTION OF THE DRAWINGS

The foregoing and other features of the present invention will become more apparent upon a consideration of the following description taken in connection with the accompanying drawings wherein.

DESCRIPTION OF AN EMBODIMENT OF THE INVENTION

Figure 1:
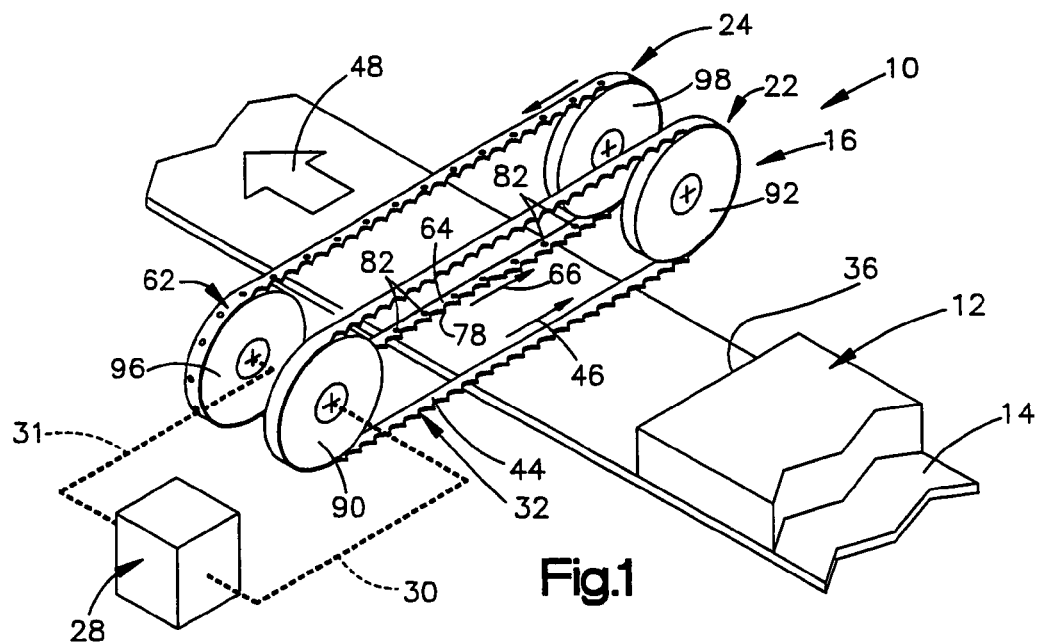
FIG. 1. is a schematic pictorial illustration of an apparatus which is used to cut wood and reduce saw dust accumulation on the wood.

An apparatus 10 (FIG. 1) is used to cut wood 12. The wood 12 is moved toward the left (as viewed in FIG. 1) by a conveyor 14. The conveyor 14 may have any one of many different known constructions. In the specific example illustrated in FIG. 1, the conveyor 14 is a belt conveyor. Known guides and rollers (not shown) are utilized to maintain the wood 12 in a desired position relative to the conveyor 14 during movement of the wood through a work station 16 by the conveyor 14.

A cutting assembly 22 is provided at the work station 16 to cut the wood 12. A dust removal assembly 24 is also provided at the work station 16. The dust removal assembly 24 is operable to remove saw dust from a saw kerf formed when the cutting assembly 22 cuts the wood 12.

A drive assembly 28 is provided to drive the cutting assembly 22 and the dust removal assembly 24. Although the drive assembly 28 includes a single motor, the drive assembly includes two separate drive mechanisms 30 and 31. Thus, one drive mechanism 30 is provided to drive the cutting assembly 22. A second drive mechanism 31 is provided to drive the dust removal assembly 24. If desired, a separate motor may be provided for each of the drive mechanisms 30 and 31.

The cutting assembly 22 includes a first or cutting band 32 having teeth 34 (FIG. 2) which engage the leading end portion 36 (FIG. 1) of the wood 12 to cut the wood. As the band 32 cuts the wood 12, a kerf or slot 40 (FIG. 3) is formed in the wood by the band 32. The cutting band 32 is formed as a continuous loop and has a known construction.

A straight lower (as viewed in FIG. 1) run 44 of the cutting band 32 extends across the conveyor 14 and moves in the direction of the arrow 46. The conveyor 14 is effective to move the wood 12 in the direction of the arrow 48 (FIG. 1) so that the teeth 34 (FIG. 2) of the lower run 44 (FIG. 1) of the cutting band 32 engage the leading end portion 36 of the wood and cut the wood at a location disposed a short distance above the conveyor belt 14 (FIG. 3). As the conveyor belt 14 continues to move the wood 12 in the direction of the arrow 48, the cutting band 32 cuts the kerf or slot 40 in the wood in a known manner.

As the cutting band 32 cuts the slot or kerf 40 in the wood 12, saw dust is generated. This saw dust tends to adhere to the flat, parallel lower and upper side surfaces 54 and 56 (FIG. 3) of the kerf 40 in the wood 12. The upper and lower side surfaces 54 and 56 on the wood 12 cooperate to form opposite side surfaces of the kerf 40.

The dust removal assembly 24 (FIG. 1) is operable to remove saw dust from the kerf 40. The dust removal assembly 24 includes a dust removal band 62. As illustrated, the dust removal band 62 is formed as a continuous loop of the same size as the continuous loop formed by the cutting band 32, although it should be understood that the loop of the band 62 could have a different size than the loop of the cutting band.

The dust removal band 62 has a straight lower run 64 which moves across the conveyor 14 in the direction of the arrow 66 (FIG. 1). The lower run 64 of the dust removal band 62 extends parallel to the lower run 44 of the cutting band 32. The lower run 44 of the cutting band 32 and the lower run 64 of the dust removal band 62 are disposed at the same distance from the upper side surface of the conveyor 14 (FIG. 3).

After the leading end portion 36 of the wood 12 has moved past the lower run 44 of the cutting band 32, the lower run 64 of the dust removal band 62 moves through an entrance 70 to the kerf 40. The dust removal band 62 has the same thickness as the cutting band 32 and is spaced the same distance from the upper side surface of the conveyor 14 as the lower run 44 of the cutting band 32. As the wood 12 is moved toward the left in FIG. 3 by the conveyor 14, saw dust generated by the cutting band 32 is engaged by the dust removal band 62. The dust removal band 62 pulls the saw dust in the direction of the arrow 66 in FIG. 1 to remove the saw dust from the kerf 40.

The dust removal band 62 is constructed so as to promote removal of dust from the slot or kerf 40 (FIG. 3) during movement of the dust removal band 62 through the kerf in the direction of the arrow 66 in FIG. 1. To promote the removal of saw dust from the kerf 40, the dust removal band 62 may be provided with openings and/or projections which engage particles of saw dust. The openings and/or projections pull the particles of saw dust along with the dust removal band 62 as it moves through the saw kerf 40 in the direction of the arrow 66. Of course, as the dust removal band 62 is moving through the saw kerf 40, the wood 12 is being moved in the direction of the arrow 48 in FIG. 1 relative to the dust removal band. This results in the wood 12 moving longitudinally past the dust removal band 62 as the dust removal band moves transversely through the kerf 40.

The dust removal band 62 has a series of openings 76 formed along a longitudinal edge portion of the dust removal band. The openings 76 are formed by projections 78 having the same general configuration as the teeth 34 on the cutting band 32. This results in the openings 76 having a generally V or notch shaped configuration.

The openings 76 have entrances between adjacent projections or teeth 78, on the longitudinally extending edge portion of the dust removal band 62. The openings face toward the cutting band 32. This facilitates movement of saw dust into the openings 76 between the teeth 78 as the wood 12 moves in the direction indicated by the arrow 48 relative to the dust removal band 62.

The lower run 64 (FIG. 1) of the dust removal band 62 is moving in the direction of the arrow 66 relative to the wood 12. Therefore, as the saw dust enters the openings 76 (FIG. 2) between the teeth 78, the teeth are effective to pull the saw dust in the direction of the arrow 66 to remove the saw dust from the kerf 40.

Although the teeth 78 (FIG. 2) on the dust removal band 62 have the same general configuration as the teeth 34 on the cutting band 32, it is contemplated that the teeth on the dust removal band 62 may have a different configuration if desired. For example, the teeth on the dust removal band may be configured so as to provide the openings 76 with an arcuate configuration which corresponds to the configuration of a portion of a circle. Alternatively, the teeth 78 may be configured so that the openings 76 have a polygonal configuration.

The teeth 78 on the dust removal band 62 extend toward the cutting band 32. Therefore, the openings 76 are formed in the longitudinally extending edge of the dust removal band 62 which is closest to the cutting band 32. It is contemplated that the opposite longitudinally extending edge portion of the dust removal band 62 may be provided with openings corresponding to the openings 76.

In addition to or instead of, the openings 76 in one or both longitudinally extending edge portions of the dust removal band 62, the dust removal band may be provided with openings 82 (FIG. 2) disposed midway between opposite longitudinally extending edge portions of the dust removal band 62. The openings 82 have a circular configuration. However, it is contemplated that the openings 82 may have a different configuration if desired. For example, the openings 82 may have an oral or polygonal configuration.

As the wood 12 is moved in the direction of the arrow 48 with the dust removal band 62 in the kerf 40 (FIG. 3), the saw dust enters the openings 82 (FIG. 2) in the dust removal band 62. At the same time, the dust removal band 62 is being moved in the direction of the arrow 66 to move the openings 82 and the saw dust contained in the openings out of the kerf 40. This results in saw dust in the openings 76 along the longitudinal edge portion of the dust removal band 62 and saw dust in the openings 82 in the central portion of the dust removal band being removed from the kerf 40 by movement of the dust removal band in the direction of the arrow 66 as the wood 12 moves in the direction of the arrow 48.

In addition to the openings 76 and 82, the dust removal band 62 is provided with projections which engage the particles of saw dust. The projections extend downward from a lower side of the lower run 64 of the dust removal band 62 toward the lower side surface 54 of the kerf 40 (FIG. 3). In addition, the projections extend upward from the upper side of the lower run 64 of the dust removal band 62 toward the upper side surface 56 of the kerf 40. These projections wipe across the lower and upper side surfaces 54 and 56 of the kerf 40 to engage and disturb particles of saw dust and pull the particles of saw dust out of the kerf 40 in the direction of the arrow 66.

Projections on the dust removal band 62 may be formed by offsetting the teeth 78 (FIG. 4) on the dust removal band 62 in opposite directions from upper and lower major side surfaces of the dust removal band. Thus, on the lower run 64 of the dust removal band 62, a trailing edge portion 83 (FIGS. 4 and 5) of one tooth 78a may be deflected downward toward the lower side surface 54 (FIG. 3) of the kerf 40. A trailing edge portion 84 (FIGS. 4 and 6) of a next adjacent tooth 78b may be deflected upward toward the upper side surface 56 of the saw kerf 40. This results in the trailing edge portions of the teeth 78 on the dust band 62 wiping across the lower and upper side surfaces 54 and 56 of the kerf 40 as the lower run 64 of the dust removal band 62 is moved in the direction of the arrow 66 in FIGS. 1 and 4. Each of the teeth 78 on the dust removal band 62 engages particles of saw dust and moves the particles of saw dust in the direction of the arrow 66 to remove the particles of saw dust from the kerf 40.

By deflecting the trailing edge portions 83 and 84 of the teeth 78 to engage the lower and upper sides 54 and 56 of the saw kerf 40, a smooth wiping action is obtained. The leading edges 85 and 86 (FIG. 4) of the teeth 78a and 78b tend to be held away from the lower and upper sides 54 and 56 of the saw kerf 40 by the deflected trailing edge portions 83 and 84 of the teeth. This minimizes any tendency for the leading edges 85 and 86 of the teeth 78 on the dust removal band 62 to dig into the wood 12.

Figure 4:
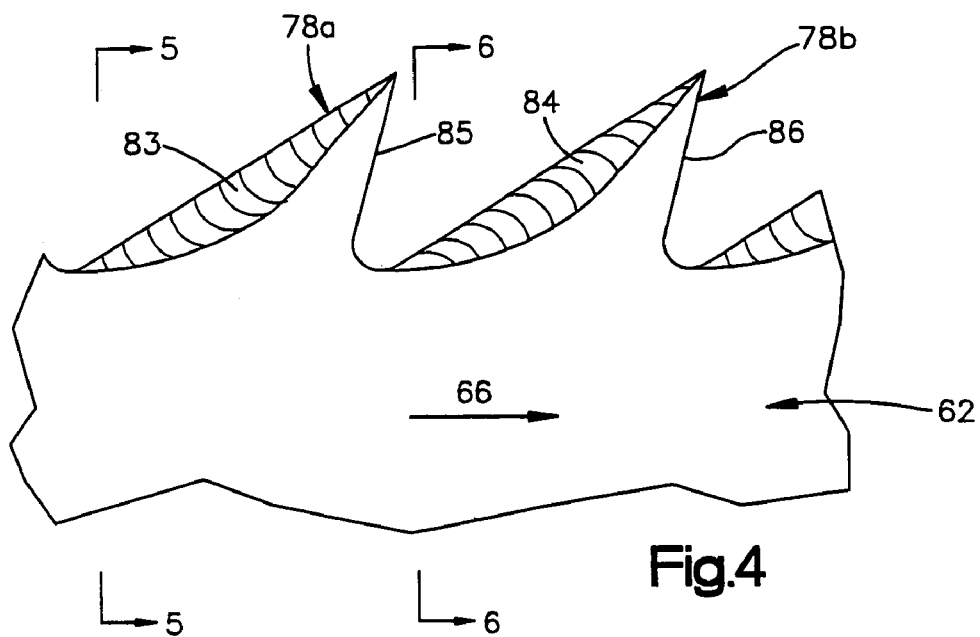
FIG. 4. is an enlarged plan view of a portion of the second band which removes saw dust from the kerf in the wood.
Figures 5, 6:
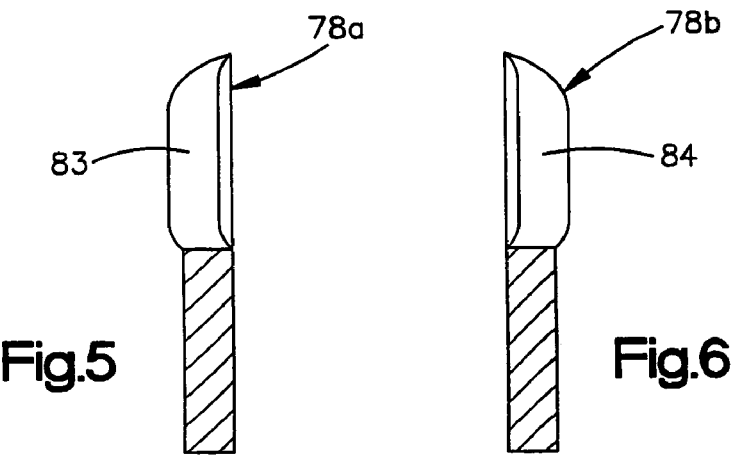
FIG. 5. is a fragmentary schematic sectional view, taken generally along the line 5—5 of FIG. 4, illustrating how a portion of a tooth on the second band which removes saw dust from the wood projects downward.
FIG. 6. is a fragmentary schematic sectional view, taken generally along the line 6—6 of FIG. 4, illustrating how a portion of a tooth on the second band which removes saw dust from the wood projects upward.

Although only two teeth 78a and 78b are illustrated in FIG. 4, it should be understood that the trailing edge portions of all of the teeth 78 on the dust removal band 62 have been offset. Every other tooth 78 on the dust removal band 62 is offset downward, like the tooth 78a of FIGS. 4 and 5. The intermediate teeth 78 disposed between the downwardly offset teeth are offset upward, like the tooth 78b of FIGS. 4 and 6. However, if desired, some of the teeth 78 may not be offset. For example, one tooth 78 may not be offset while an immediately following tooth is offset downward and an immediately preceding tooth is offset upward.

Although it is believed that it may be preferred to deflect only the trailing edge portions 83 and 84 (FIGS. 4–6) of the teeth 78, the entire tooth may be deflected if desired. Thus, the entire tooth 78a (FIG. 4) may be deflected downward toward the lower side surface 54 (FIG. 3) of the saw kerf 40. Similarly, the entire tooth 78b (FIG. 4) may be deflected upward toward the upper side surface 56 of the saw kerf 40.

In addition to, or instead of, the projections formed by offsetting the teeth 78 on the dust band 62, projections may be formed along the edges of the circular openings 82 (FIG. 2) in the central portion of the dust band 62. Thus, during formation of the openings 82, projections are formed extending upward and/or downward from the upper and lower major side surfaces of the dust removal band 62. These projections also wipe across the lower and upper side surfaces 54 and 56 (FIG. 3) of the kerf 40 to further dislodge and remove saw dust from the kerf.

Figure 7:
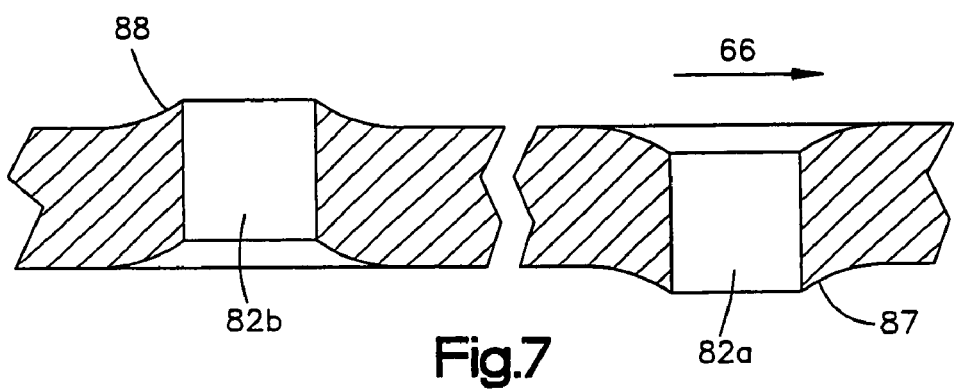
FIG. 7. is an enlarged schematic sectional view illustrating the manner in which projections are formed at adjacent openings in the second band which removes saw dust from the kerf in the wood.

In the embodiment of the dust removal band 62 illustrated in FIG. 7, a projection 87 extends downward from an opening 82a toward the lower side 54 (FIG. 3) of the saw kerf 40. Similarly a projection 88 extends upward from a next adjacent opening 82b toward the upper side 56 of the saw kerf 40. The projections 87 and 88 have an annular configuration and are formed during the formation of the openings 82a and 82b. The opening 82a is formed by a downwardly moving punch while the opening 82b is formed by an upwardly moving punch.

It is contemplated that projections may be formed on the dust band 62 in a different manner if desired. For example, abrasive material may be secured to opposite sides of the dust removal band 62. This abrasive material would wipe along the lower and upper side surfaces 54 and 56 of the kerf 40 as the lower run 64 of the dust removal band 62 moves through the saw kerf 40 in the direction of the arrow 66.

Alternatively, the projections from the opposite side surfaces of the dust removal band 62 may be formed by roughening the side surfaces with a series of small ridges or beads. These small ridges or beads may be formed by knurling or a different process if desired. The ridges or beads may be formed as a series of linear or arcuate ridges on opposite sides of the dust removal band 62. Alternatively, the ridges or beads may be formed as a series of bumps or protrusions having an arcuate or polygonal configuration. For example, diamond shaped protrusions may be formed. Regardless of how they are shaped and/or formed, wiping of the projections across the lower and upper side surfaces 54 and 56 of the kerf 40 will dislodge particles of saw dust from the side surfaces.

The projections result in upper and lower sides of the lower run 64 of the dust removal band 62 having an irregular configuration. This irregular configuration of the upper side of the dust removal band 62 promotes engagement of particles of saw dust in the kerf 40 by the opposite sides of the lower run 64 of the dust removal band 62. The projections are effective to push the saw dust particles out of the saw kerf 40 as the lower run 64 of the dust removal band 62 moves in the direction of the arrow 66 relative to the wood 12.

It should be understood that the dust removal band 62 may be formed with various combinations of openings and/or projections. For example, the projections may be omitted and the saw dust removed from the kerf 40 by only openings 76 and/or 82 in the dust removal band 62. Similarly, the openings 76 and 82 in the dust removal band 62 may be omitted and the particles of saw dust removed from the saw kerf 40 by only projections from opposite sides of the dust removal band. However, it is believed that it may be preferred to utilize a combination of projections and either one or both of the openings 76 and 82 in the dust removal band 62.

The drive assembly 28 is operable to drive the cutting band 32 and dust removal band 62 at speeds which are a predetermined function of each other. The drive assembly 28 may include a single motor which is operable to drive both the cutting band 32 and dust removal band 62. Alternatively, the drive assembly 28 may include a pair of motors. One of the motors would be operable to drive the drive mechanism 30 and the cutting band 32. The other motor of the pair of motors would be operable to drive the drive mechanism 31 and the dust removal band 62.

The drive motor or motors may be connected with the cutting band 32 and dust removal band 62 by drive mechanisms 30 and 31 having any one of many different known constructions. For example, the motor or motors may be connected with the cutting band 32 and dust removal band 62 by one or more belt drive mechanisms. Alternatively, the motor or motors may be connected with the cutting band 32 and dust removal band 62 through one or more gear drive mechanisms.

Figure 2:
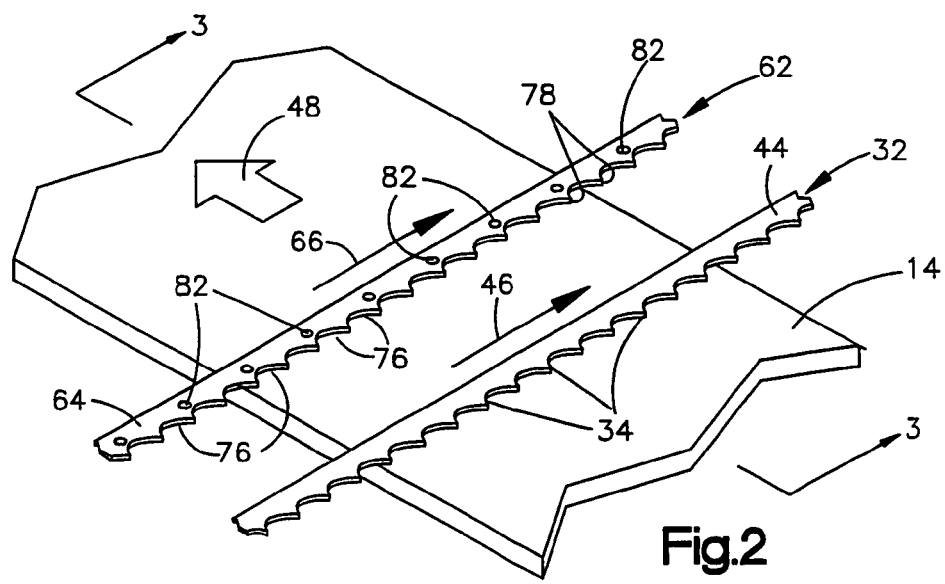
FIG. 2. is an enlarged schematic pictorial view of a portion of the apparatus of FIG. 1 and illustrating a relationship between a first band which cuts the wood and a second band which removes saw dust from a kerf formed in the wood by the first band during cutting of the wood.
Figure 3:
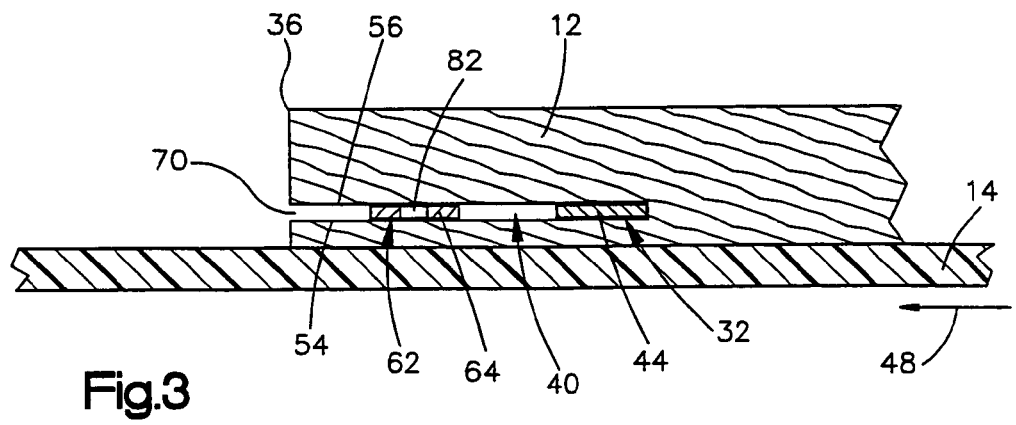
FIG. 3. is a schematic plan view, taken generally along the line 3—3 of FIG. 2, illustrating the manner in which the first band cuts wood and the second band removes saw dust from a kerf formed in the wood by the first band during cutting of the wood.

In the embodiment of the invention illustrated in FIGS. 1–3, the cutting assembly 22 is of the band saw type. Thus, the cutting assembly 22 includes a pair of pulleys or rollers 90 and 92 around which the cutting band 32 extends in a continuous loop. The pulley 90 is driven by the drive mechanism 30. The pulley 92 is an idler pulley and is driven by force transmitted through the cutting band 32. Of course, both pulleys 90 and 92 may be driven by the drive assembly 28 if desired.

The dust removal assembly 24 has a construction which is generally similar to the construction of the cutting assembly 22. Thus, the dust removal assembly 24 includes a pair of pulleys or rollers 96 and 98. The dust removal band 62 is formed as a continuous loop which extends around the pulleys 96 and 98. The pulley 96 is driven by the drive mechanism 31. The pulley 98 is an idler pulley and is driven by force transmitted through the dust removal band 62. However, if desired, the drive assembly 28 may drive both of the pulleys 96 and 98.

In the embodiment of the invention illustrated in FIG. 1, the pulleys 90 and 92 in the cutting assembly 22 and the pulleys 96 and 98 in the dust removal assembly 24 rotate about axes which extend parallel to a longitudinal central axis of the conveyor 14. The drive pulleys 90 and 96 have the same diameter and have coincident central axes. Similarly, the idler pulleys 92 and 98 have the same diameter and have coincident central axes. The lower runs 44 and 64 of the cutting band 32 and dust removal band 62, respectively, extend perpendicular to a longitudinal central axis of the conveyor 14.

It should be understood that the cutting assembly 22 and/or dust removal assembly 24 may have a different construction and/or orientation relative to the conveyor 14. For example, the cutting assembly 22 and dust removal assembly 24 could each include more than two pulleys. As another example, the lower runs 44 and/or 64 may be skewed at an acute angle to the longitudinal central axis of the conveyor 14. Although the lower runs 44 and 64 of the bands 32 and 62, respectively, have been illustrated as extending parallel to each other, one of the runs may be skewed relative to the other run. Thus, the lower run 64 of the dust removal band may be skewed at an acute angle to the longitudinal central axis of the conveyor 14 and may be skewed relative to the lower run 44 of the cutting band 32.

It is believed that it may be desired to construct a drive assembly 28 with a single motor having belts which drive the pulleys 90 and 96. The belt which drives the pulley 90 in the cutting assembly 22 is driven faster than the belt which drives the pulley 96 in the dust removal assembly 24. Since the drive pulleys 90 and 96 in the cutting assembly 22 and dust removal assembly 24, respectively, are the same size, the cutting band 32 will move faster than the dust removal band 62. Thus, the speed of movement of the lower run 44 of the cutting band 32 in the direction of the arrow 46 is greater than the speed of movement of the lower run 64 of the dust removal band 62 in the direction of the arrow 66.

It is believed that it will be preferred to drive the cutting band 32 at a speed which is at least twice as great as the speed at which the dust removal band 62 is driven. In one specific embodiment of the invention, the lower run 44 of the cutting band 32 moved at a rate of approximately 6,600 feet per minute in the direction of the arrow 46. The lower run 64 of the dust removal band 62 moved at a speed of approximately 1,100 feet per minute in the direction of the arrow 66. It should be understood that the foregoing specific speeds of movement for the lower runs of the cutting band 32 and dust removal band 62 have been set forth herein for purposes of clarity of description. It is contemplated that the drive assembly 28 may be operated to drive the cutting band 32 and dust removal band 62 at speeds which are different than these specific speeds.

In the embodiment of the invention illustrated in FIG. 1, the cutting assembly 22 is a band saw. However, it is contemplated that the cutting assembly 22 may be constructed as a circular saw or a reciprocating saw. Similarly, it is contemplated that the dust removal assembly 24 may utilize a circular member or a reciprocating member instead of the dust removal band 62. It is contemplated that the cutting assembly 22 and dust removal assembly 24 may be constructed with any desired combination of bands, rotating members, and/or reciprocating members.

In the embodiment of the invention illustrated in FIG. 1, the drive assembly includes a single motor which drives the cutting assembly 22 and dust removal assembly 24 through belt drive systems 30 and 31. However, it is contemplated that known gear drive systems may be utilized to connect the drive motor with the cutting assembly 22 and dust removal assembly 24. If desired, one motor may be provided to drive the cutting assembly 22 and a second motor may be provided to drive the dust removal assembly 24. If this is done, the cutting assembly drive motor and/or dust removal assembly drive motor may be either directly or indirectly connected with the drive pulley 90 or 96.

In view of the foregoing description, it is believed that it will be apparent that the present invention provides a new and improved apparatus 10 for cutting wood 12 and reducing saw dust accumulation on the wood. The apparatus includes a first band 32 which cuts the wood 12. A second band 62 removes saw dust from a kerf 40 formed in the wood by the first band 32 during cutting of the wood 12.

The first band 32 may be moved at a first speed relative to the wood. The second band 62 may be driven at a second speed which is slower than the first speed. In one specific instance, the first band 32 was moved at a speed which was at least twice as great as the speed at which the second band 62 was moved.

The second band 62 may include projections which engage the wood during removal of saw dust. The projections on the second band 62 may be formed at locations where openings extend through the second band. These openings may be formed by teeth 78 along one edge portion of the second band 62 and/or by openings 82 disposed between opposite edge portions of the second band.

Having described the invention, the following is claimed:

1. An apparatus for use in cutting wood and reducing saw dust accumulation on the wood, said apparatus comprising:
a first continuous band which moves along a first continuous path at a first speed and which cuts the wood and creates saw dust during cutting of the wood, said first band having a straight run along which the first band moves in a first direction at the first speed during cutting of the wood, said straight run of said first band having a series of teeth which cut the wood to form saw dust and a kerf in the wood,
a second continuous band which moves along a second continuous path a second speed which is less than the first speed and which removes saw dust from the kerf formed in the wood by the first band while the first band is cutting the wood, said second band having a straight run along which the second band moves in the first direction at the second speed which is less than the first speed while said straight run of said first band is moving in the first direction at the first speed and is cutting the wood, said straight run of said second band being at least partially disposed in the kerf in the wood and being effective to remove saw dust from the kerf in the wood during at least a portion of the cutting of the wood by said straight run of said first band,
a first band drive which engages said first band and moves the first band along the first path at the first speed, and
a second band drive which engages the second band and moves the second band along the second path at the second speed which is less than the first speed while the first band is moving along the first path at the first speed during cutting of the wood by said straight run of said first band.

2. An apparatus as set forth in claim 1 wherein said first band has a plurality of teeth which move at the first speed and engage the wood during cutting of the wood, and said second band has a plurality of projections which move at the second speed and engage the wood during removal of saw dust from the kerf in the wood.

3. An apparatus as set forth in claim 1 wherein said first band has a plurality of teeth which engage the wood during cutting of the wood, and said second band has a plurality of teeth which engage the wood during removal of saw dust from the kerf in the wood.

4. An apparatus as set forth in claim 1 wherein said first band includes a series of teeth which extend from said first band in a direction away from said second band, said second band includes a series of teeth which extend from said second band in a direction toward said first band.

5. An apparatus as set forth in claim 1 wherein said straight run of said first band extends parallel to said straight run of said second band.

6. An apparatus as set forth in claim 1 wherein the first speed at which said first band drive moves said first band is at least twice as great as said second speed at which said second band drive moves said second band.

7. An apparatus as set forth in claim 1 wherein said second band drive is operable to move said second band at a speed which is a predetermined function of said first speed at which said first band drive moves said first band.

8. An apparatus as set forth in claim 1 wherein said second band includes a plurality of openings in which saw dust is received during removal of saw dust from the kerf in the wood.

9. An apparatus as set forth in claim 8 wherein said second band includes first and second edge portions, said openings being at least partially disposed between said first and second edge portions of said second band.

10. An apparatus as set forth in claim 8 wherein a plurality of teeth which are ineffective to cut wood are disposed along one edge of said second band, said openings being at least partially disposed between adjacent teeth on said second band.

11. An apparatus for use in cutting wood and reducing saw dust accumulation on the wood, said apparatus comprising:

a conveyor which is operable to move a piece of wood along a path with a first side of the piece of wood facing upwardly and a second side of the piece of wood facing downwardly, a first continuous band which moves along a first continuous path at a first speed and which cuts the piece of wood and creates saw dust during cutting of the piece of wood, said first band having a straight run which extends across and is parallel to an upwardly facing side of said conveyor, said straight run of said first band having a series of teeth which cut the piece of wood to form saw dust and a kerf which is parallel to the upwardly facing side of said conveyor and which is formed between and is spaced apart from the first and second sides of the piece of wood, a second continuous band which moves along a second continuous path at a second speed which is less than the first speed and which removes saw dust from the kerf formed in the piece of wood by the first band while the first band is cutting the piece of wood, said second band having a straight run which extends across and is parallel to the upwardly facing side of said conveyor, said straight run of said second band being at least partially disposed in the kerf in the piece of wood and being effective to remove saw dust from the kerf in the piece of wood during at least a portion of the cutting of the piece of wood by said straight run of said first band, a first band drive which engages said first band and moves said first band along the first path at the first speed, and a second band drive which engages said second band and moves said second band along the second path at the second speed which is less than the first speed.

* * * * *